Feb. 20, 1968          R. SCHREIECK                3,370,263
           SLIPRING ASSEMBLY AND METHOD OF MAKING
Filed Feb. 11, 1966                          2 Sheets-Sheet 1

INVENTOR
RAINER SCHREIECK

BY *Sughrue, Rothwell, Mion, Zinn & Macpeak*

ATTORNEYS

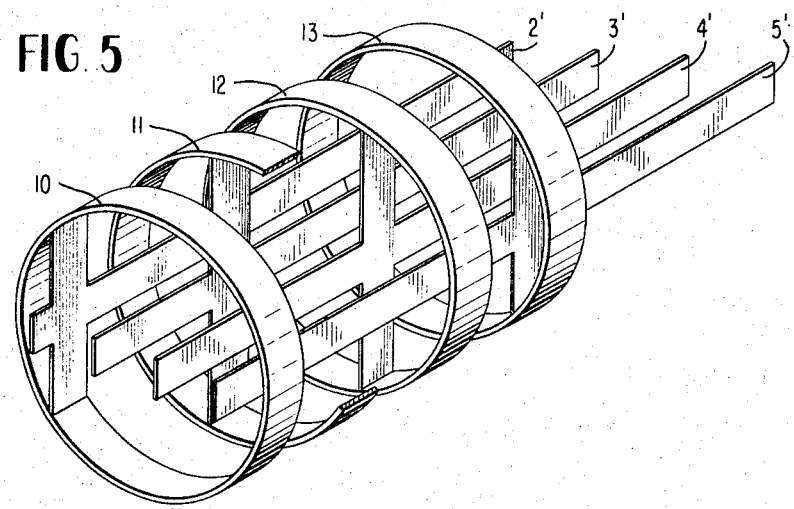
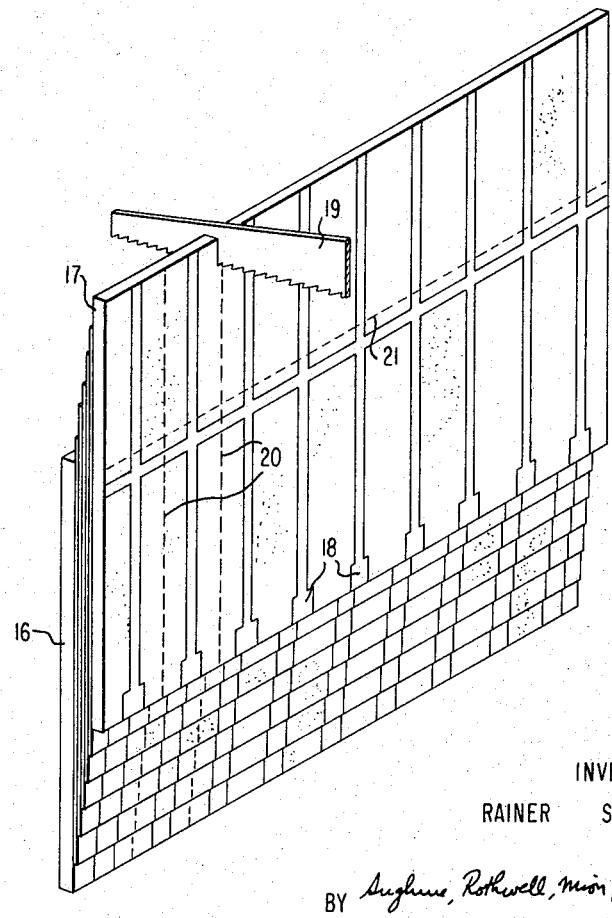

United States Patent Office 3,370,263
Patented Feb. 20, 1968

3,370,263
SLIPRING ASSEMBLY AND METHOD OF MAKING
Rainer Schreieck, Stuttgart-Fellbach, Wurttemberg-Baden, Germany, assignor to Teldix Luftfahrt-Ausrustungs GmbH, Heidelberg-Wieblingen, Germany
Filed Feb. 11, 1966, Ser. No. 526,861
Claims priority, application Germany, Feb. 11, 1965, T 27,971
8 Claims. (Cl. 339—5)

The invention is directed to a slipring assembly having a plurality of sliprings with the supply connections thereto contained within the insulating block upon which the sliprings are mounted. The sliprings are produced by the deposition of conducted material in the form of circumferential strips. At the same time this method of placing the conductive sliprings on the insulating block will also simultaneously make a connection with the supply leads contained in the insulating block of material.

The prior art slipring assemblies were of comparatively complicated design and the mode of connection between the supply leads and the sliprings detracted from the rigidity and strength of the insulating block upon which the sliprings are mounted. The insulating block of the prior art devices required a plurality of boreholes and recesses therethrough into which the bare leads of the supply wires were inserted in order to make electrical connection with the sliprings. Due to the presence of the boreholes in the insulating block the rigidity and strength of the slipring assembly was substantially weakened since the wires extending through the boreholes did not contribute to the strength of the assembly due to their loose fit in the bore holes. For this reason the diameters of the sliprings and the insulating block upon which they are mounted must be comparatively large if several sliprings are to be provided because the width of the assembly and the bending stresses increase with the number of sliprings.

The present invention aims at increasing the number of sliprings without increasing the outside diameter or reducing the diameter without reducing the number of sliprings in a particular assembly. For some applications, for example, gyroscopic instruments, slipring assemblies with the smallest possible diameter are required in order to reduce the friction torque of the brushes. At the same time the present invention simplifies the production process of a slipring assembly.

The slipring assembly of the present invention is directed to an insulating block made of laminated and bonded insulating plates which are partly covered by metal films. The metal films are used as power supply connections. In this way the supply connections are rigidly contained in the insulating block and the design is considerably simplified. Insulating material and supply connections serve as a support for the sliprings. The entire assembly is solid thereby contributing to the rigidity of the construction. The available cross-sectional area of the first slipring to which all supply connections have to pass is fully utilized by material which serves as a support. The metal films are preferably laid out in a rectangular pattern with the longitudinal supply connections following the center lines of the insulating plates thereby locating all the supply connections parallel to the slipring axis. The lateral supply connections to the sliprings are staggered in the direction of the slipring axis with their ends connected to the respective slipring in the manner of a chord. The insulating plates are arranged in steps thereby exposing the longitudinal supply connections for a sufficient length in order to permit the attachment of the supply leads thereto by soldering or the like.

The present invention is also directed to the method of making the slipring assembly. A blank made of bonded insulating plates with metal films as described above is turned on a lathe to make recesses for the sliprings. These recesses or grooves for the sliprings are cut into the block at those places where the lateral supply connections terminate. The inside surfaces of the grooves are then vapor-deposited with metal and this coating is increased by electroplating. This latter operation is most conveniently done by connecting all the supply connections to the negative pole of a suitable power source. The method of vapor-depositing a conducting base coating provides the required conditions for a firm growth of the sliprings formed by electroplating. The deposited sliprings simultaneously make an electrical connection with the lateral supply connections although the cross-sectional area of the lateral connection is only about 40 ($\mu$) microns thick. The edges of the lateral connections may be blurred or bent by the turning operation which may favorably contribute to a firm electrical connection with the deposited slipring.

A more complete appreciation of the invention and many of the attendant advantages thereof will be readily apparent as the same becomes understood by reference to the following detailed description when considered in connection with accompanying drawings wherein:

FIGURE 5 is a schematic perspective view of the sliprings and the metal coatings as they would appear without the insulating material; and FIGURE 6 shows a laminated insulation block prior to being subdivided into slipring assembly blanks.

The slipring assembly comprises a cylindrical body comprised of a lamination of a plurality of insulating plates, each having first electrically conductive means on one surface thereof and a plain plate of insulating material, each of said conductive means comprises a strip of conductive material extending from one end of the respective plate on which said strip is located and intersecting the cylindrical surface of said body in spaced relation to the other points of intersection of each of the other strips with said cylindrical surface along the length of said cylindrical surface, a plurality of circumferential grooves in said cylindrical surface, each of which intersects one of said conductive strips, second electrically conductive means located in each of said grooves and electrically connected to said first conductive means in each of said grooves.

The slipring assembly may be made by applying an electrically conductive strip of material to each of a plurality of substantially rectangular insulating plates in such a manner that each strip extends from one end of said plate to an adjacent side of said plate at a point intermediate the ends of said plate, arranging said plates in face to face relation to provide a stack of plates with said conductive strip-carrying face of each plate oriented in the same direction and the ends of said strips adjacent to the sides of said plates being in spaced relation to each other along the length of said stack of plates, placing a plain insulating plate in superimposed relation upon said stack to cover the exposed conductive strip, bonding said plates together to form a solid block, shaping at least a portion of said block where the ends of said strips extend to the side surface into a cylindrical shape with a plurality of circumferential grooves therein intersecting said ends of said strips and placing the electrically conductive material in said grooves in electrical contact with said ends of said strips.

Figure 1:
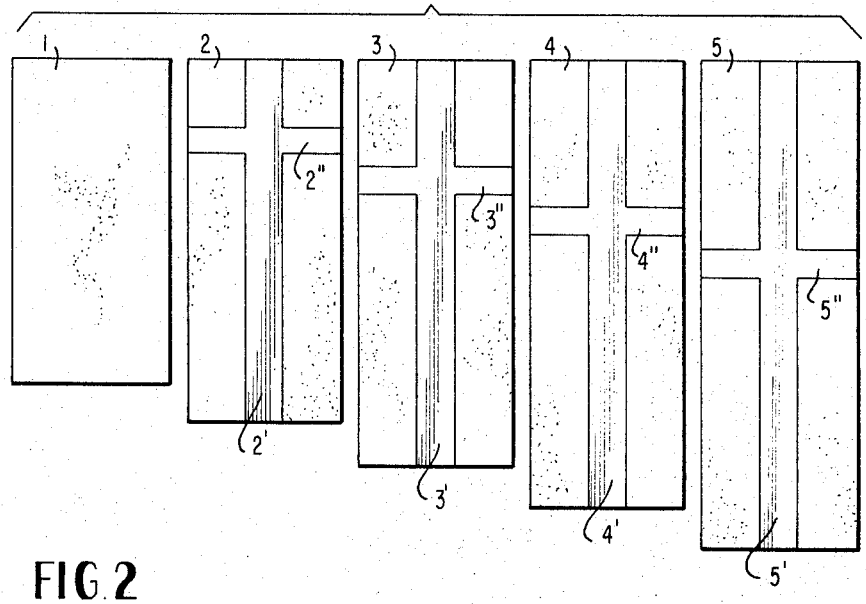
FIGURE 1 shows the five insulating plates, four of which are provided with supply connections, from which the slipring assembly is produced.
Figure 2:
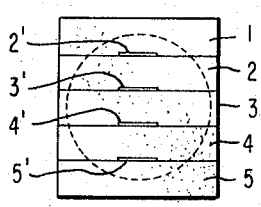
FIGURE 2 shows an end view of the laminated insulating block.
Figure 3:
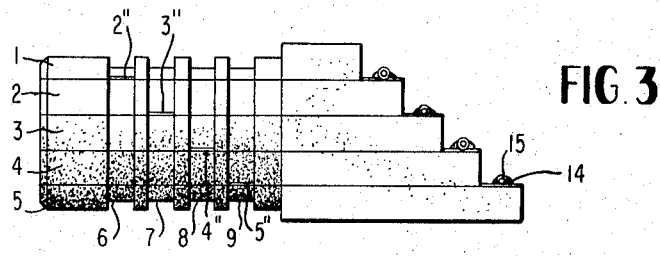
FIGURE 3 is a side view of the prepared blank ready to be vapor-deposited, without the sliprings.

Turning now to a more detailed description of the invention, the five insulating plates marked 1-5, of equal thickness, are arranged in side by side relationship in FIGURE 1. Plates 2-5 are provided with a rectangular pattern of electrically conductive material on the surface thereof. Such a conductive coating may be produced by using any of the well known photochemical methods wherein an electrically conductive cover is applied to the entire surface of each plate and selected portions are subsequently etched away. The electrically conductive material on each of the plates 2-5 is in the form of a cross with the strip of material indicated as 2'-5' comprising the longitudinal supply connections and the strips 2"-5" comprising the lateral supply connections. Each of the plates 1-5 are of equal width and progressively increasing lengths. When the plates are stacked upon one another as shown in FIGURES 2 and 3, the top ends of each of the plates as viewed in FIGURE 1 are aligned vertically with each other. The opposite end of the stack is therefore arranged in a staggered step-like arrangement. Such a staggered step-like arrangement of the plates exposes a portion of the end of each longitudinal supply connection 2'-5' as clearly shown in FIGURE 4. The plates are then bonded by a glue which after hardening has similar qualities to the plate material with regard to the strength, insulating capacity and machineability.

After the individual plates 1-5 have been laminated together the half of the blank where the lateral supply connections 2"-5" come to the surface is turned into a cylindrical shape and provided with four grooves 6-9. The grooves are cut into the block at the same places where the lateral supply connections 2"-5" come to the surface. The grooves have the same width as the lateral supply connections and provide the required space for the sliprings. The grooves in the assembly are now provided with a vapor-deposit of silver which is done under vacuum. The assembly is then dipped into a solution of silver cyanide and serves as the cathode. The free ends of the longitudinal supply connections 2'-5' are electrically connected to the anode which consists of pure silver. The silver plating is continued until the plating has reached the sufficient thickness for machining without any danger of the sliprings becoming loose in the insulating block. The resulting sliprings are now smoothed and if required, are subjected to further surface treatment. The conducting material in between the sliprings is entirely removed.

Figure 4:
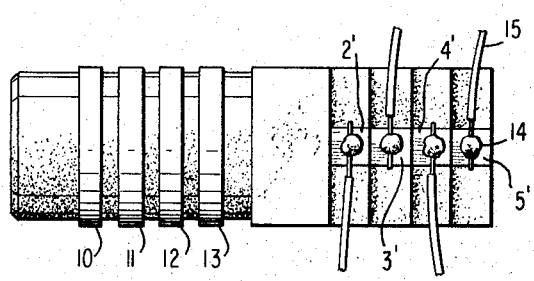
FIGURE 4 is a top view of the complete slipring assembly.

The completed slipring assembly is shown in FIGURE 4 with the sliprings marked 10-13. The sliprings protrude over the surface of the insulating block but it is also possible to cut the grooves deeper and make the sliprings thinner so that the insulating material is protruding in between the sliprings. The recessed end of the block with the steps shows the ends of the supply connections 2'-5'. The supply leads 15 are secured to the longitudinal supply connections by soldering 14 or other suitable means.

FIGURE 5 shows a perspective view, somewhat in the form of an X-ray picture, of the longitudinal and lateral supply connections and their connection to the sliprings. All of the insulating material has been removed from the device in FIGURE 5 in order to better show the internal arrangement of the various electrically conductive parts.

FIGURE 6 shows a block of blanks for the production of slipring assemblies which would be provided with six sliprings. The insulating plates are not all of the same thickness. The two outside plates 16 and 17 are many times thicker than the thin inside plates. The thickness of these inside plates must be sufficient to provide insulation of the supply connections against one another. The pattern of the supply connections is similar to the pattern on plate 5 in FIGURE 1 and is repeated nine times next to one another. Moreover, the ends 18 of the longitudinal supply connections have been made wider to facilitate the connection of the supply leads. For greater simplicity, all plates are of the same size and covered in part by metal strips although the covering of the uppermost plate 17 is superfluous as it is removed during the turning operation. The block of blanks can be cut into nine parts, as for example, by means of a saw 19 along the broken lines 20 of which only two are shown. Then the superfluous recessed ends are removed along the broken line 21 of each block. The resulting blanks are of the same kind as the above described construction as shown in FIGURES 3 and 4 with the exception that these blanks contain six sliprings.

While only two embodiments have been disclosed, it will be obvious to those skilled in the art that modifications can be made therein without departing from the disclosed inventive concept. For example the pattern of the electrically conductive means on the insulating plates need not be limited to the cross form shown in FIGURE 1. Either half of the lateral supply connections, the top portion of the longitudinal supply connection above the lateral supply connection as viewed in FIGURE 1 or a combination of these portions may be omitted depending upon which edge portions of the substantially rectangular plate should be intersected by the supply connections. The supply connection may also take the form of an electrically conductive strip extending from one end of the plate and curving to one side or the other, or both sides, of the plate to provide the lateral supply connections. Also, the ends of the longitudinal supply connections may be widened, somewhat in the fashion shown at 18 in FIGURE 6 but extending the entire width of the insulating plate. It is also conceivable that the supply connections could be placed on both sides of the insulating plate with proper insulation between adjacent plates being provided by the intermediary of a blank insulating plate or the insulating bonding material which secures the plates together in their laminated form. Accordingly, it is desired that the invention be limited only by the scope of the claims hereinafter following.

What is claimed is:

1. A slipring assembly comprising a cylindrical body comprised of a lamination of a plurality of insulating plates each having first electrically conductive means on one surface thereof and a plain plate of insulating material, each of said conductive means comprising a strip of conductive material extending from one end of the respective plate on which said strip is located and intersecting the cylindrical surface of said body in spaced relation to the other points of intersection of each of the other strips with said cylindrical surface along the length of said cylindrical surface, a plurality of circumferential grooves in said cylindrical surface, each of which intersects one of said conductive strips, second electrically conductive means located in each of said grooves and electrically connected to said first conductive means in each of said grooves.

2. A slipring assembly according to claim 1 wherein each of said plates is of a different length and the ends of said plates having said conductive strips thereon are arranged in progressive step-like order thereby exposing a surface portion of each of said strips to facilitate electrical connection of supply leads thereto.

3. A slipring assembly according to claim 1 wherein each of said plates is generally rectangular in shape and said first conductive means on each of said plates comprises a strip of conductive material extending longitudinally of said plate and spaced from the sides of said plate and a further strip of conductive material extending from side to side of said plate and intersecting said longitudinally extending strip at a point spaced from the ends of said longitudinally extending strip.

4. A slipring assembly according to claim 1 wherein the outer plates of said lamination are substantially thicker than the inner plates thereof.

5. Method of making a slipring assembly comprising,
(a) applying an electrically conductive strip of material to each of a plurality of substantially rectangular insulating plates in such a manner that each strip extends from one end of said plate to an adjacent side of said plate at a point intermediate the ends of said plate,
(b) arranging said plates in face to face relation to provide a stack of plates with said conductive strip-carrying face of each plate oriented in the same direction and the ends of said strips adjacent the sides of said plates being in spaced relation to each other along the length of said stack of plates,
(c) placing a plain insulating plate in superimposed relation upon said stack to cover the exposed conductive strip,
(d) bonding said plate together to form a solid block,
(e) shaping at least the portion of said block where the ends of said strips extend to the side surface into a cylindrical shape with a plurality of circumferential grooves therein intersecting said ends of said strips, and
(f) placing electrically conductive material in said grooves in electrical contact with said ends of said strips.

6. The method according to claim 5 wherein said electrically conductive material is applied to said grooves by vapor-depositing silver in said grooves and subsequently electro-depositing silver on said vapor-deposited coat of silver to increase the thickness of said coating.

7. Method of making a slipring assembly comprising,
(a) applying a plurality of electrically conductive strips of material in parallel spaced relation to each other to a plurality of insulating plates and a single transversely extending electrically conductive strip which intersects each of said parallelly arranged electrically conductive strips to each of said plurality of insulating plates with said transverse strip being spaced the same distance from the ends of said plate the same amount on each of said plates,
(b) arranging said plates in face to face relation in a staggered step-like arrangement to provide a stack of plates with a conductive strip-carrying face of each plate oriented in the same direction thereby staggering the transverse conductive strips with respect to each other along the length of the parallel conductive strips,
(c) bonding said plates together to form a solid block,
(d) separating said block into a plurality of small blocks along a plurality of lines each located intermediate the parallel conductive strips,
(e) removing the overlapping portions of said boards at the ends of said blocks opposite the end where the conductive strip on each board is exposed,
(f) shaping at least the portion of said block where the ends of said transverse strip extend to the side surface into a cylindrical shape with a plurality of circumferential grooves therein intersecting said ends of said strips, and
(g) placing electrically conductive material in said grooves in electrical contact with said ends of said strips.

8. The method according to claim 7 wherein said electrically conductive material is applied to said grooves by vapor-depositing silver in said grooves and subsequently electro-depositing silver on said vapor-deposited coat of silver to increase the thickness of said coating.

References Cited
UNITED STATES PATENTS

| | | | |
|---|---|---|---|
| 2,703,868 | 3/1955 | Rausenberger | 339—5 |
| 3,219,557 | 11/1965 | Quintana | 339—8 |
| 3,243,866 | 4/1966 | Pandapas et al. | 29—597 |
| 3,318,785 | 5/1967 | Armstrong et al. | 29—597 |

MARVIN A. CHAMPION, *Primary Examiner.*

RAYMOND S. STROBEL, *Assistant Examiner.*